United States Patent

Stotts

[11] 3,909,113
[45] Sept. 30, 1975

[54] OPTICAL COUPLER
[75] Inventor: Larry B. Stotts, Chula Vista, Calif.
[73] Assignee: The United States of America as represented by the Secretary of the Navy, Washington, D.C.
[22] Filed: May 1, 1974
[21] Appl. No.: 465,962

[52] U.S. Cl. ................... 350/160 LC; 350/160 R
[51] Int. Cl.² ................... G02B 5/14; G02F 1/16
[58] Field of Search ............................ 350/160 LC

[56] References Cited
UNITED STATES PATENTS

| | | | |
|---|---|---|---|
| 3,679,290 | 7/1972 | Adams et al. | 350/160 LC X |
| 3,726,584 | 4/1973 | Adams et al. | 350/150 |
| 3,772,685 | 11/1973 | Masi | 350/160 LC X |
| 3,787,779 | 1/1974 | Spitz et al. | 350/160 R |
| 3,791,716 | 2/1974 | Borel et al. | 350/160 LC |
| 3,842,275 | 10/1974 | Haas et al. | 250/331 |

OTHER PUBLICATIONS

Schnur et al., "Prospectus for the Development of Liquid-Crystal Waveguides," NRL Report 7507, Nov. 10, 1972, pp. 9–12 cited.

*Primary Examiner*—Robert Segal
*Attorney, Agent, or Firm*—R. S. Sciascia; G. J. Rubens; J. W. McLaren

[57] ABSTRACT

The circular dichroism exhibited by cholesteric liquid materials is employed to couple light having selected determinable wavelength and circular polarization out of an optical path. Thin films of selected cholesteric liquid crystal materials are interposed in an optical path so that the circular dichroism of the liquid crystal materials causes scattering of light energy having a particular combination of wavelength and circular polarization which is characteristic of the properties of each such material. Light energy which is not within the affected wavelength and circular polarization combinations is transmitted along the optical path without significant attenuation. The scattered light is coupled out of the optical path where it may be suitably detected for signal information content. The coupler may be rendered tunable by impressing an electric field across the cholesteric liquid crystal material to change the helical pitch of its molecular alignment, causing a commensurate change in the wavelength of light energy which will be scattered.

5 Claims, 5 Drawing Figures

OPTICAL COUPLER

BACKGROUND OF THE INVENTION

In optical communications and data transmissions systems it is desirable to be able to couple light energy out of an optical path carrying signal information. In the prior art light energy has been coupled out of optical paths in such systems through the use of a grating coupler, employing a periodic diffraction grating on the surface of the material which comprises the optical path such as the core area of a fiber optic signal path with the cladding removed.

In the practice of this type of prior art technique, photoresist material may be used to fabricate the diffraction grating. The use of such a diffraction grating as a passive coupler inherently involves two principal limitations in that, (1) it has only one state of active operation, that being the "on" state and (2) its construction renders it tuned to one particular wavelength defined by the diffraction grating period established in its fabrication.

Active versions of the diffraction grating coupler have been proposed which would eliminate either one or both of these principal limitations but such active versions inherently involve limitation of the data rate of signal information which may be coupled through the use of the diffraction grating device and also imposes some limitations upon the waveguide materials which may be used due to the addition of a "off" state.

Another prior art alternative employed to couple light out of an optical path is the use of the prism coupler. The prism coupler technique is practiced by situating a prism at a certain critical distance proximate to the optical path so that frustrated photo reflection is upheld. In the practice of this latter technique the magnitude of light leakage is dependent upon the thickness and refractive index of the film of material which comprises the optical path, the refractive index of the prism and the waveguide, the angle of the incident beam, and the wavelength of the light energy involved, as well as its plane of polarization. The critical dependence upon these parameters in the employment of the prism type optical coupler gives rise to a number of disadvantages. These include (1) critical air gap tolerance (2) only one state of operation unless very sophisticated mechanical placement devices are used to move the prism in and out in relation to the optical path, and (3) data rate limitation for an active device.

SUMMARY OF THE INVENTION

Cholesteric liquid crystal materials exhibit circularly dichroic structures which are distinguished by sensitivity to a particular wavelength region characteristic of each such different material. That is to say that, one circularly polarized component of an incident light beam within the characteristic wavelength region will be transmitted by the liquid crystal material without significant attenuation, while the other circularly polarized component of the same characteristic wavelength will be scattered. Depending upon the specific cholesteric liquid crystal material, either the right or the left-hand circularly polarized component of an incident light beam may be affected by the described phenomenon.

Since this phenomenon involves not only particular wavelength regions which are characteristic of different cholesteric liquid crystal materials, but also either right or left-hand circular polarization, there are numerous combinations of wavelength and circular polarization which can be employed to render cholesteric liquid crystal materials sensitive to different light energy signals and virtually insensitive to all light energy signals of different combinations of wavelength and circular polarization.

More specifically, the concept of the present invention conceives the use of the circular dichroic properties of cholesteric liquid crystal materials as light beam selection mechanisms. Because of the circular dichroism of cholesteric liquid crystal materials, a specific combination of wavelength region and circular polarization of an incident beam is scattered and may thereby be coupled out of an optical path by a thin film of a selected cholesteric liquid crystal material interposed in that optical path. However, the light energy of the same wavelength region but of the opposite circular polarization, as well as all other wavelength and polarization combinations, will be transmitted through the selected cholesteric liquid crystal material substantially without attenuation or light loss.

Accordingly, this phenomenon is proposed to be utilized in the concept of the present invention to provide selective light coupling in an optical path, in either a passive or active embodiment as desired. In a optical data bus system, for example, the concept of the present invention may be employed to give effect to selective coupling with multiple reception points where the system employs an optical waveguide to transmit optical signal information in a wavelength-polarization multiplex system.

In utilizing the circular dichroism which characterizes different cholesteric liquid crystal materials, the concept of the present invention contemplates an optical coupler for transferring light energy of selected wavelength and circular polarization. In its most fundamental form, the concept of the present invention comprises an optical path capable of transmitting light energy of selected wavelength and circular polarization and additionally, a thin film of cholesteric liquid crystal material disposed contiguous to the optical path.

The cholesteric liquid crystal material is characterized by having a homogeneous molecular alignment defined by a determinable helical pitch and helical direction which coincides with the selected wavelength and circular polarization, respectively. Accordingly, light energy of the selected wavelength and circular polarization which traverses the thin film of cholesteric liquid crystal material is scattered, thus enabling such light energy to be selectively coupled to another light path which may include, for example, a suitable photoresponsive device adapted to convert the light energy to a commensurate electrical signal.

It may be noted that in accordance with the concept of the present invention, the thin film of cholesteric liquid crystal material should have homogeneous molecular alignment as contrasted to a homeotropic molecular alignment; as used herein the term "homogeneous" is intended to describe molecular alignment where the helical axis is perpendicular to the direction of travel of the light energy intercepted by the cholesteric liquid crystal material; the term "homeotropic" is intended to describe molecular alignment where the helical axis is parallel to the direction of travel of the light energy intercepted by the cholesteric liquid crystat material; a third state is known as "focal-conic texture" which refers to a non-parallel, random molecular orientation giving rise ot a birefringent condition.

Further, as conceived by the present invention, a plurality of the described couplers may be disposed along an optical path, such as an optical waveguide of fiber optic or thin film configuration, with a transmitting station coupled into the optical path for multiplexing signal information contained in the beams of optical energy. Each beam is characterized and distinguished by a different combination of wavelength and circular polarization and by appropriate selection of different cholesteric liquid crystal materials disposed along the optical path, different points along the optical path can be rendered selectively responsive. Selective coupling of signal information out of the optical path is thus given effect by means of selective scattering so that predetermined transmission and reception can be affected, as and when desired.

In one typical configuration, the thin film of selected cholesteric liquid crystal material may be positioned between abutting ends of material comprising the optical path in which it is to operate as a coupling device. The optical path may, for example, comprise fiber optic material of a single or multiple filament type, an optical waveguide in the form of a thin film of light-conductive material, a channel optical waveguide, or other forms of optical paths.

In accordance with the concept of the present invention it is only necessary that the selected cholesteric liquid crystal material in the form of a thin film be disposed relative to the optical path so as to intercept light energy traversing the optical path. The selectivity of the device in performing a coupling function relative to only a particular combination of wavelengths and circular polarization of light signals is inherent in the optical characteristics exhibited by the selected material. Coupling light energy out of the optical path at any particular point or points is essentially determined by selection of the wavelength and circular polarization combination of light energy which is transmitted along the optical path from one or more transmission points for example.

In a variant embodiment of the present invention, transparent electrodes may be used to impress an electric field across the cholesteric liquid crystal material for changing the helical pitch of its molecular alignment thereby causing a commensurate change of the wavelength region of light energy which is scattered by the cholesteric liquid crystal material.

Accordingly, it is a primary object of the present invention is to provide an optical coupler which is responsive for transferring light energy of selectively determinable wavelength and circular polarization combinations.

An equally important object of the present invention is to provide such an optical coupler which affords on - off coupling capability in accordance with the selection of particular wavelengths and circular polarization combinations.

Another object of the present invention is to provide a an optical coupler employing liquid crystal material which is not dependent for its operation upon the thickness of such materials.

Yet another object of the present invention is to provide an optical coupler which will accommodate a plurality of data carrying light energy beams multiplexed in transmission over a common optical path simultaneously for coupling out signal information only at selectively determinable reception points.

A further object of the present invention is to provide an optical coupler which may be employed in such an optical multiplexing system where the several optical beams carrying signal information may be propagated along the common optical path simultaneously without interference with a plurality of reception points where coupling is not desired nor selected.

Another object of the present invention is to provide an optical coupler which is adapted to the selective determination of wavelength and circular polarization of the signals to which it responds and which is not inherently limited to the data rate of signal information which it will couple out of an optical path.

Another object of the present invention is to provide such an optical coupler which may be employed in an optical system at a plurality of reception points and in which each such optical coupler causes minimal loss to transmitted optical signal information having wavelength and circular polarizations other than that which such coupler is designed to couple out of the optical path.

A further object of the present invention is to enable tunability of such an optical coupler by impressing an electric field on it to change the wavelength region of light energy to which it is responsive.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
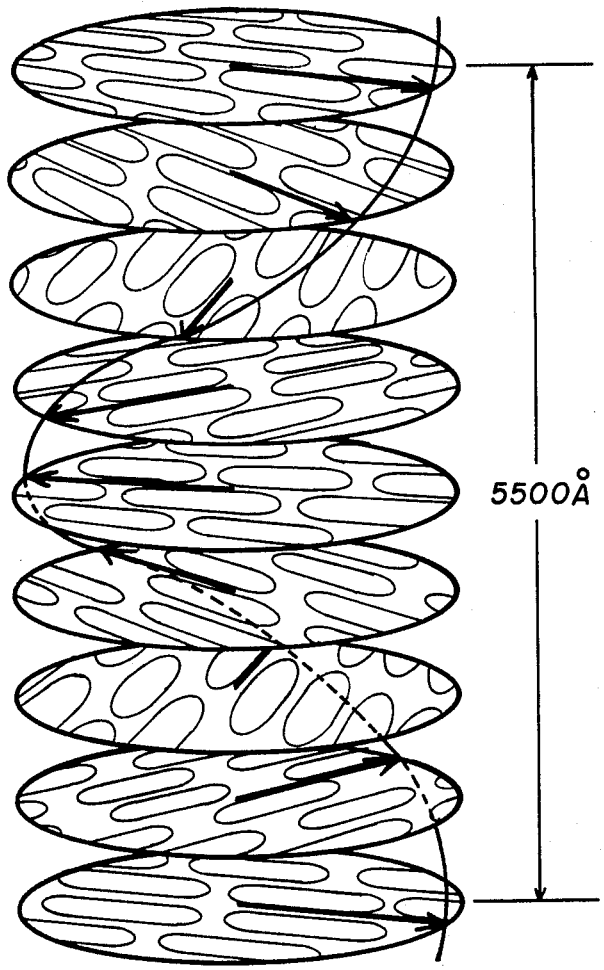
FIG. 1 is a schematic representation of a theoretical model depicting the homogeneous molecular alignment defining the helical pitch and helical direction which renders different cholesteric liquid crystal materials responsive to different wavelength and circular polarization combinations of light energy.

FIG. 1 illustrates a theoretical model depicting the probable organization of cholesteric liquid crystal material having a helical pitch and a helical direction which is determinative of the wavelength and circular polarization to which such cholesteric liquid crystal material is uniquely responsive to cause an amount of scattering of light energy traversing it.

It should be noted that the molecular alignment changes from layer to layer as indicated by the arrows so that through a multiplicity of layers the molecular alignment changes through a full 360° in a determinable distance which, in the illustration of FIG. 1, is expressed by the example of 5500A. It is this distance (expressed in terms of Angstrom units) which determines the particular wavelength to which a cholesteric liquid crystal material is responsive; and it is the righthandedness or lefthandedness of the helically developed change in orientation of the molecular layers which determines whether the particular cholesteric liquid crystal material concerned is responsive to scatter right-hand or left-hand circularly polarized light of the same wavelength that is determined by the pitch of the helix.

Thus, it is the pitch of the helical disposition of the molecular structure which determines the wavelength of light at which maximum scattering in a particular cholesteric liquid crystal material will occur; the right-handedness or left-handedness of the helical pitch determines whether that wavelength of light energy in right or left circularly polarized form will be scattered, which is also characteristic of the cholesteric liquid crystal material.

Though the illustration of FIG. 1 is believed to be a reasonable exposition and explanation of the phenomenon employed in accordance with the concept of the present invention, it should be borne in mind that the usefulness and operation of the present invention, together with its attendant advantages and desirable features, is not dependent upon the accuracy or scientific validity of the theoretical representation illustrated by FIG. 1.

Figure 2:
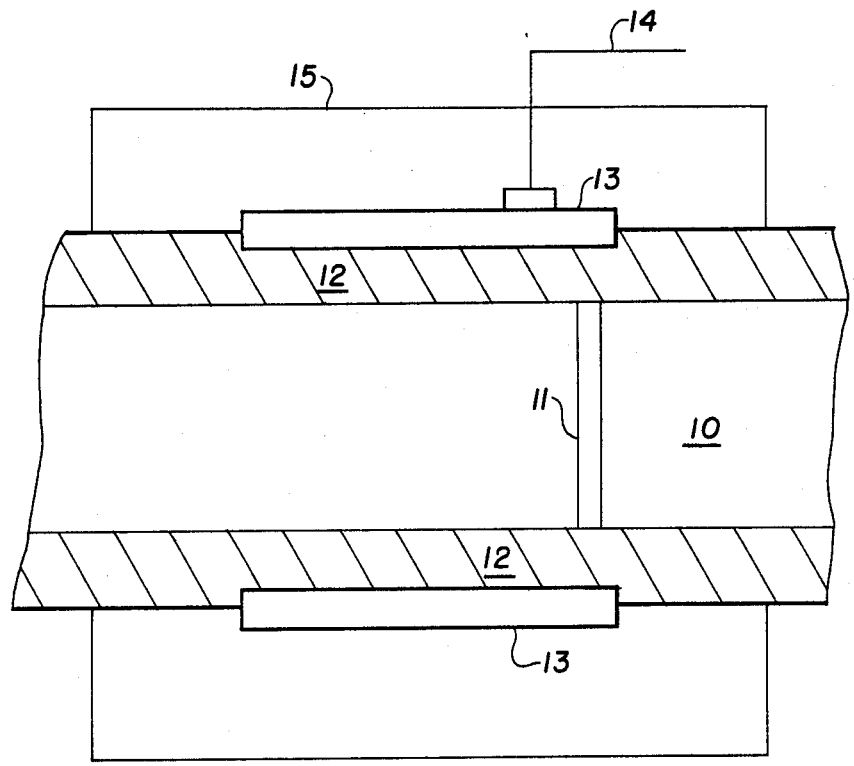
FIG. 2 is a greatly enlarged partially cross-sectional representation of an embodiment of the present invention.

FIG. 2 is an illustration of an embodiment of the optical coupler of the present invention for transferring light energy of seleted wavelength and circular polarization. An optical path 10 is capable of transmitting light energy of the selected wavelength and circular polarization and may comprise a fiber optic light path in the form of a single or multiple filaments. A thin film of cholesteric liquid crystal material 11, usually of the order of several microns in thickness, ranging from approximately 2 microns to 12 microns, is disposed contiguous to the optical path 10 and in the particular embodiment illustrated in FIG. 2 is positioned between the abutting ends of the fiber optic material which comprises the optical path.

The cholesteric liquid crystal material 11 is characterized by having a homogeneous molecular alignment defined by a determinable helical pitch and direction coinciding with the selected wavelength and circular polarization, respectively, which it is desired to couple out of the optical path 10. In the context as used herein the term homogeneous molecular alignment is intended to describe that molecular arrangement and disposition in which the helical axis is perpendicular to the direction of travel of the intercepted light energy, as contrasted to homeotropic molecular alignment.

The wavelength and circular polarization of the light energy which is scattered by the thin film of cholesteric liquid crystal material is determined by the helical pitch and helical direction of its molecular alignment as illustrated in the theoretical model of FIG. 1.

Since the cholesteric liquid crystal material 11 is chosen to be responsive to only one combination of selected wavelength of light energy and direction of circular polarization, it consequently will only couple out a singular particular selected wavelength and circular polarization by transfer of light energy through the cladding 12 which surrounds the optical path 10. Such cladding is cutomarily substantially transparent, but of a lower index of refraction than the optical path 10 which it surrounds to give effect to total internal reflection, enhancing the efficiency of the optical path 10 as a light conduit.

However, when light energy of the particular selected wavelength and circular polarization impinges upon the cholesteric liquid crystal material 11, light scattering is caused which couples a portion of the light traversing the optical path 10 out of the optical path, and through the cladding 12 for reception by a suitable photo-responsive means 13.

Typical photo-responsive materials are cadmium sulfide, cadmium selenide, gallium arsenide, aluminum arsenide and silicon arsenide, for example, which are responsive to the reception of light energy for developing a commensurate electrical signal. The electrical signal thus developed is conducted over a suitable electrical connection 14 for use as may be required in the detection portion of an optical system. The entire combination of optical path 10, cladding 12, photo-responsive means 13, and electrical connector 14, may be encased in a suitable supporting body of encapsulating material 15.

Figure 3:
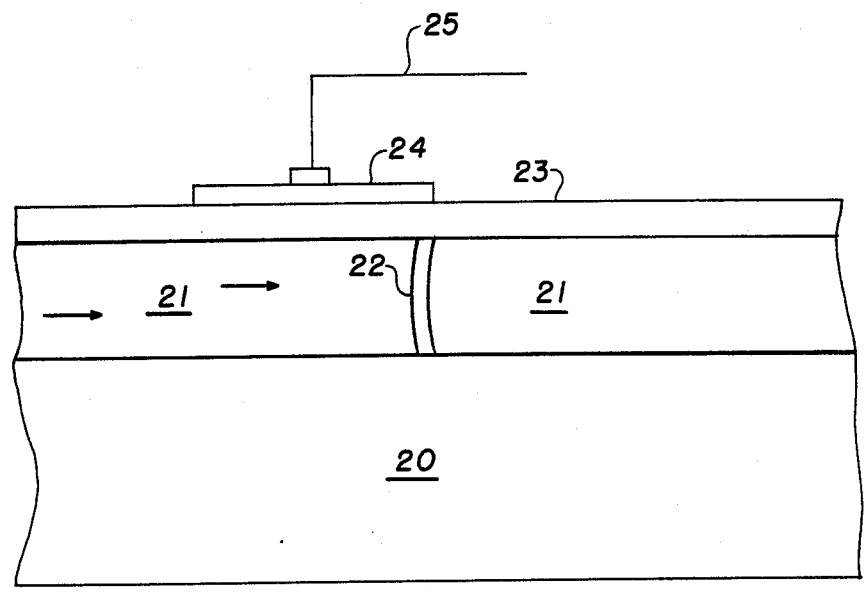
FIG. 3 is a representation of an alternate form of the present invention.

FIG. 3 is an illustration of a variant embodiment of the present invention used in conjunction with a planar or channel type of waveguide as an optical path. A suitable substrate material 20 supports a thin film of light conductive material 21 in a planar or channel type of configuration. A thin film of selected cholesteric liquid crystal material 22 is interposed in the optical path which is comprised of the light transmitting material 21. A suitable cladding material 23 is employed to protect the optical path comprised of the light transmitting material 21 and also to insure total internal reflection of light energy traveling along the optical path 21 by reason of the cladding material 23 having a lower refractive index than that of the light transmitting material 21.

A suitable photo-responsive element 24 is positioned proximate to the thin film of cholesteric liquid crystal material 22 and is selected to develop electrical signals commensurate with the signal information contained in the light energy of the particular wavelength and circular polarization which is scattered by the thin film of cholesteric liquid crystal material 22. An electrical connection 25 is employed to transmit the electrical signals thus developed to other portions of the overall system to be employed as desired.

In the practice of the present invention, the thin film of cholesteric liquid crystal material 22 is selected to be responsive to one particular combination of wavelength and circular polarization of light energy in accordance with the phenomenon previously described. Light energy of that particular wavelength and circular polarization combination will, upon reaching the thin film of cholesteric liquid crystal material 22, be scattered and transmitted through the protective cladding 23 which, though of lower refractive index than the light transmitting material 21 is nonetheless transparent.

The scattered light transmitted through the transparent cladding 23 reaches the photo-responsive element 24 and develops signals commensurate with the signal information as contained in the scattered light energy. Therefore, the configuration of the present invention as embodied in the illustration in FIG. 3 will be responsive to a selected combination of wavelength and circular polarization light energy much in the manner of the embodiment illustrated in FIG. 2. It will be appreciated by those skilled and knowledgable in the pertinent arts that the thin film of cholesteric liquid crystal material 22 may be selected from a number of materials each of which exhibits the characteristic of producing light scattering in response to a different combination of wavelength and circular polarization of light energy.

Figure 4:
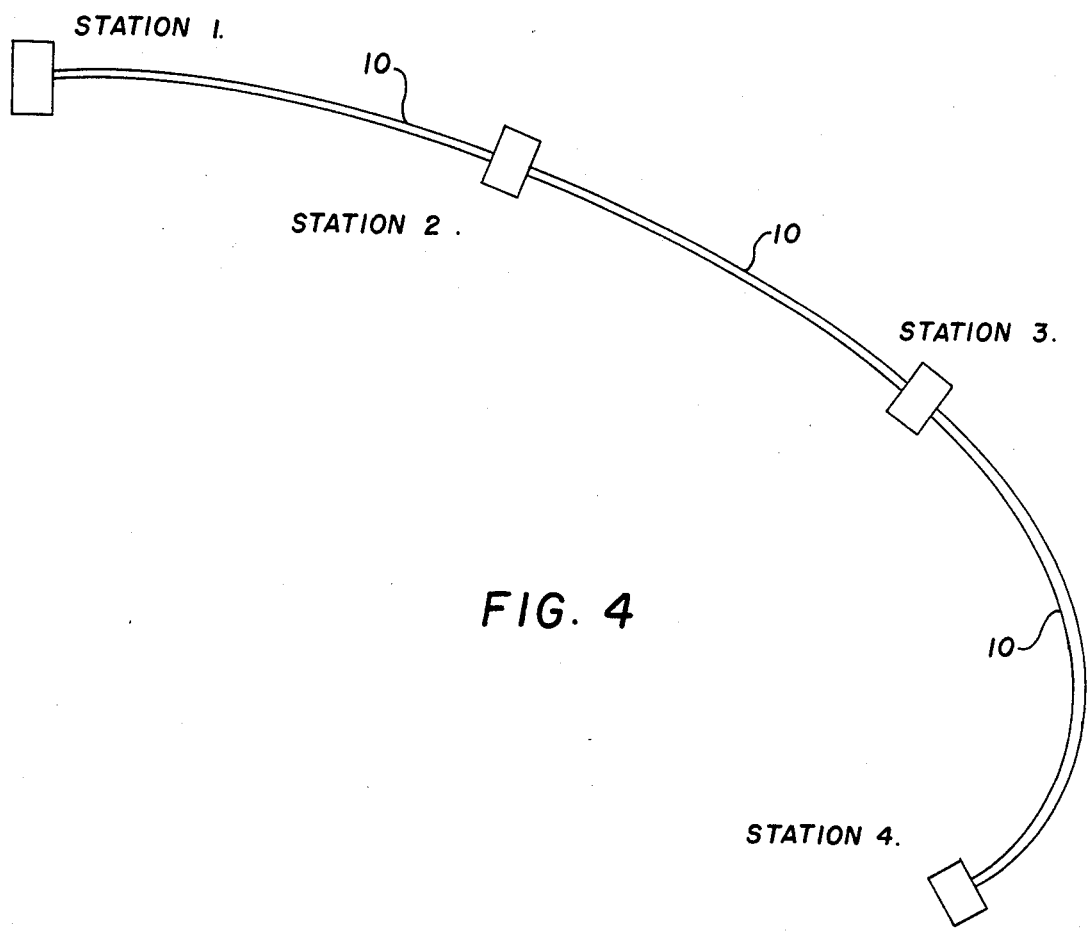
FIG. 4 is a representation of an optical multiplex data bus system employing passive optical couplers of the present invention.

FIG. 4 illustrates an optical data bus system representing an example of how four stations along a common optical path may be linked and provide selective communication through the use of several optical couplers of the present invention. For purposes of illustration and explanation, it may be assumed that Station No. 1 is a transmitting station while Stations No. 2, 3, and 4 are receiving stations.

Further, for purposes of explanations it may be presumed that Stations No. 2, 3, and 4 each have a passive optical coupler fabricated and chosen in accordance with the concept of the present invention so that each of the Stations No. 2, 3, and 4, are responsive to a different combination of selected wavelength and circular polarization of light energy.

Thus, when Station No. 1 desires to transmit to Station No. 2, it will transmit that particular selected combination of wavelength and circular polarization of light energy to which Station No. 2 is uniquely responsive in the system illustrated in FIG. 4. For example, Station No. 2 may be responsive to approximately the 6000A wavelength region and left-hand circular polarization by the use of a cholesteric liquid crystal material comprising 12% cholesteryl chloride and 88% cholesteryl oleyl carbonate by molecular weight. Similarly, Station No. 3 may be rendered responsive only to approximately the 5000A wavelength region of light energy having right-hand circular polarization through the use of a cholesteric liquid crystal material of 20% cholesteryl iodide and 80% cholesteryl chloride by molecular weight.

In an analagous fashion, Station No. 4 may be rendered responsive to only one particular combination of wavelength and circular polarization of light energy by the choice of a cholesteric liquid crystal material within the optical coupler of the present invention such as 72% cholesteryl hexanoate and 28% cholesteryl iodide by molecular weight which determines its responsivity to a selected wavelength region of 5000A and left-hand circular polarization.

Accordingly, when Station No. 1 wishes to transmit only to Station No. 3, the information which it is desired to convey may be employed to modulate light energy having a wavelength of approximately 5000A and a right-hand circular polarization. Such combination of selected wavelength and circular polarization will be transmitted through Station No. 2 and Station No. 4 without scattering. However, upon such wavelength of 5000A and right-hand circular polarization light energy signals traversing the optical coupler at Station No. 3, an amount of light energy will be scattered, transferring that scattered light energy to a photo-responsive means which typically is capable of developing a commensurate electrical signal representative of the signal information contained in the light energy transmitted from Station No. 1.

In a similar fashion, when it is desired to communicate from Station No. 1 to Station No. 2, light energy of approximately 6000A wavelength and left-hand circular polarization may be modulated with signal information at Station No. 1. Upon transmission along the optical path 10 and reaching Station No. 2, such light energy will be partially scattered because of the responsiveness of the optical coupler of the present invention at its particular selected wavelength and circular polarization.

The scattered light energy will similarly actuate a suitable photo-responsive means for developing signal information of an electrical nature commensurate with the signal information contained in the light energy traversing the optical path 10. Such light energy having a wavelength of substantially 6000A and a left-hand circular polarization will not, however, be scattered by the optical couplers incorporated in Stations No. 3 and 4 and therefore will not interfere with the normal operation of Stations No. 3 and 4.

Similarly, Station No. 1 may communicate directly with Station No. 4 by the modulation of light energy having a wavelength of approximately 5000A and left-hand circular polarization which is characteristic of the responsivity of Station No. 4 to a selected combination of wavelength and circular polarization of light energy.

Such light energy, however, will pass freely through Stations No. 2 and 3 without significant attenuation, while the photo-responsive element included in combination with the optical coupler of the present invention employed in Station No. 4 will develop an electrical signal commensurate with the signal information contained in the light energy scattered by the passive optical coupler of the present invention used in Station No. 4.

Those knowledgable and skilled in the art will appreciate that Station No. 1 is not restricted to transmitting one particular combination of wavelength and circular polarization of light energy signals at a time, but may employ well known multiplex techniques to transmit multiple signal information, each intended for a different station but traversing the same optical path simultaneously without interference with other signal information or other receiving stations. Station No. 1 may also be rendered uniquely responsive to a particular combination of wavelength and circular polarization of light energy by use of an optical coupler of the present invention comprising a cholesteric liquid crystal material of 83% cholesteryl chloride and 17% cholesteryl oleyl carbonate which exhibits the scattering phenomenon upon reception of light energy in the 6000A wavelength region which is also of right-hand circular polarization.

Additionally, of course, Stations No. 2, 3, or 4 may be a transmitting station as well as a receiving station, since there is no limitation inherent in the optical coupler of the present invention which would prevent the incorporation of a suitable transmitting means at each such station to function in cooperation with the receiving optical coupler of the present invention and provide the additional capability to the system of transmitting light energy signals as well as their reception. Such transmitting means would require only suitable coupling into the optical path 10 in a manner and at a point so as not to interfer with the described operation of the optical couplers of the present invention.

Figure 5:
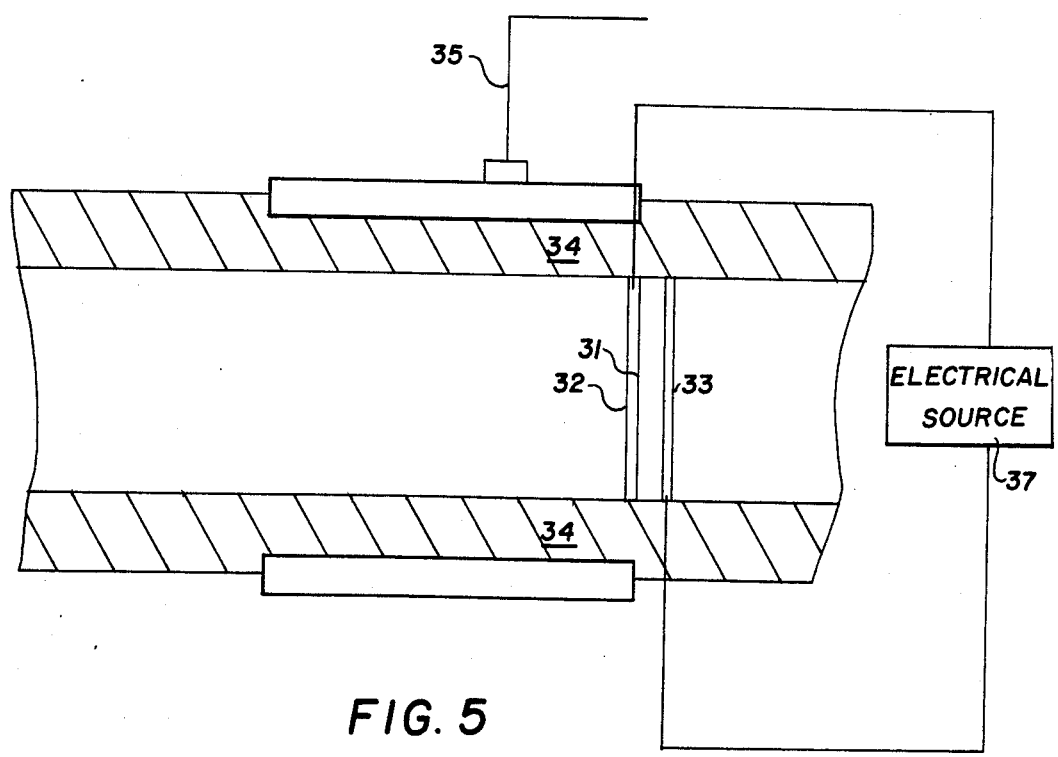
FIG. 5 is an illustration of a tunable embodiment of the present invention.

FIG. 5 illustrates an embodiment of the present invention in which the optical coupler is rendered tunable by the impression of an electric field across the thin film of cholesteric liquid crystal material. In the illustration of FIG. 5 the optical path 30 may comprise a fiber optic element which may conventionally take the form of a single of multiple filaments. A thin film of cholesteric liquid crystal material 31 is disposed contiguous to the optical path 30 positioned between abutting ends of the fiber optic material. On opposite sides of the thin film of cholesteric liquid crystal material 31 are transparent electrodes 32 and 33 which may be composed of any suitable conductive and substantially transparent material such as tin oxide, indium oxide or doped glass films of the order of approximately 800 to 1000A in thickness.

The fiber optic light path 30 is enclosed within a suitable cladding material 34 which is conventionally transparent to most wavelengths of light energy but of a lower refractive index than the fiber optic material 30 so as to uphold total internal reflection. A photoresponsive means 35 is disposed adjacent the optical path 30 for developing electrical signals commensurate with the signal information contained in the light energy which it receives. An electrical connector 36 is employed for conducting electrical signals to the remainder of the system for data processing storage or such other uses as may be desired.

Also included in the embodiment illustrated in FIG. 5 is an electrical source 37 which may include switch means for switching the electrical source on and off, as well as suitable means for varying the amplitude of potential provided as an output. The electrical source 37 is connected across the two transparent electrodes 32, and 33 so that its electrical potential will create an electric field across the thin film of cholesteric liquid crystal material 31. The electric field thus imposed operates to cause a molecular realignment, resulting in a change in the helical pitch of the material with the result that the thin film of liquid crystal material is responsive to a different wavelength of light energy than it was in its quiescent state.

Variation in the amplitude of the potential applied across the thin film of cholesteric liquid crystal material 31 can be employed to selectively vary the wavelength of light which will be scattered as a result of impinging on the thin film of cholesteric liquid crystal material. However, the helical pitch of the molecular alignment, that is to say its right-handedness or left-handedness, will remain the same.

Thus, it may be seen and readily appreciated by those knowledgable and skilled in the pertinent arts that the concept of the present invention includes not only a passive optical coupler which is responsive to light energy having a singular distinctive combination of wavelength and circular polarization, but also includes the variant embodiment wherein the application of an electric field to the thin film of cholesteric liquid crystal material is contemplated to render it responsive for scattering selectively determinable wavelengths of light having, however, the same circular polarization.

Such selective variation of wavelengths of light energy responsive for coupling may be varied through a range of as much as several thousand Angstrom units, using suitable cholesteric liquid crystal materials such as mixtures of cholesteryl chloride, cholesteryl monanoate, and cholesteryl oleyl carbonate, for instance. Two examples of such mixtures are (1) 37.5% cholesteryl chloride, 25% cholesteryl nonanoate, and 37.5% cholesteryl oleyl carbonate; (2) 48.05% cholesteryl chloride, 20.9% cholesteryl nonanoate, 31.05% cholesteryl oleyl carbonate which provide tunability within the 3400A and 7400A spectral regions, respectively. Other cholesteric liquid crystal materials can be used to provide controllably responsive wavelength selections at different spectral regions.

Obviously many modifications and variations of the present invention are possible in the light of the above teachings. It is therefore to be understood that within the scope of the appended claims the invention may be practiced otherwise than as specifically described.

What is claimed is:

1. An optical coupler for transferring light energy of selected wavelength and circular polarization comprising:

an optical path comprising light conducting means capable of transmitting light energy including said selected wavelength and circular polarization along a determinable principal optical axis;

a source of light of said selected wavelength and circular polarization and means for directing said light along said axis;

a thin film of cholesteric liquid crystal material disposed in said optical path substantially perpendicular thereto to intercept said principal optical axis, said material having a homogeneous molecular alignment defined by a determinable helical pitch and direction coinciding with said selected wavelength and circular polarization, respectively, for laterally scattering light energy of said selected wavelength and circular polarization;

transparent electrodes disposed one on each side of said thin film of cholesteric liquid crystal material; and a source of variable electrical potential arranged for connection across said electrodes, whereby to cause selective variations of the molecular alignment of said cholesteric liquid crystal material from said determinable pitch and direction for rendering it selectively responsive to laterally scatter different wavelengths of light energy commensurate with said selective variations;

and photo-responsive means disposed parallel to said principal optical axis adjacent said light conducting means and said cholerestic liquid crystal material to receive light energy laterally scattered by said cholesteric liquid crystal material.

2. An optical coupler as claimed in claim 1 wherein said photo-responsive means is operative to develop signals as a function of received laterally scattered light energy.

3. An optical coupler as claimed in claim 1 wherein said cholesteric liquid crystal material is positioned between abutting ends of material comprising said optical path.

4. A plurality of optical couplers as claimed in claim 1, each coupler comprising a thin film of cholesteric liquid crystal material disposed contiguous to said optical path at a different section and having a determinable helical pitch and direction coinciding with a different combination of selected wavelength and circular polarization.

5. A plurality of optical couplers as claimed in claim 4 and including means for transmitting light signals of selected wavelength and circular polarization combination along said optical path for transferring signal information only to optical couplers responsive to said selected wavelength and circular polarization combinations.

* * * * *